United States Patent [19]
Pohl

[11] Patent Number: 5,619,600
[45] Date of Patent: Apr. 8, 1997

[54] NEAR-FIELD PHOTON TUNNELING DEVICES USING LIQUID METAL

[75] Inventor: Wolfgang D. Pohl, Adliswil, Switzerland

[73] Assignee: International Business Machines Corporation, Armonk, N.Y.

[21] Appl. No.: 140,800

[22] Filed: Oct. 21, 1993

[30] Foreign Application Priority Data

Oct. 22, 1992 [EP] European Pat. Off. .............. 92810814

[51] Int. Cl.$^6$ ...................................................... G02B 6/36
[52] U.S. Cl. .................................. 385/15; 385/2; 385/23; 385/19; 385/40; 385/140; 385/17
[58] Field of Search ................................... 385/2, 71, 73, 385/17, 19, 23, 40, 15, 140

[56] References Cited

U.S. PATENT DOCUMENTS

| | | | |
|---|---|---|---|
| 4,387,954 | 6/1983 | Beasley | 385/12 X |
| 4,712,866 | 12/1987 | Dyott | 385/11 |
| 5,283,852 | 2/1994 | Gibler et al. | 385/102 X |

OTHER PUBLICATIONS

Digonnet et al "Analysis of a Tunable single mode optical fiber coupler", IEEE Jour. of Quantum Electronics, vol. QE–18, No. 4, Apr. 1982, pp. 746–754.
Fawcett et al, "In–line fiber–optic intensity modulator using electro–optic polymer", Electronics Letters, 28, No. 11, May 1992, pp. 985–986.

*Primary Examiner*—Rodney B. Bovernick
*Assistant Examiner*—Hemang Sanghavi
*Attorney, Agent, or Firm*—Robert M. Trepp

[57] ABSTRACT

A near-field photon tunneling device consisting of a plurality of optical waveguides, such as optical fibers, arranged in juxtaposition with a variable tunnel gap through which photons from at least one of said optical fibers can be caused to tunnel, and wherein the tunnel gap is filled with a metal that is liquid at room temperature or at moderately elevated temperature. The width of the tunnel gap and the corresponding thickness of the liquid metal layer is remotely controllable. The control mechanisms for the width of the gap include optical means, piezo-electric elements and temperature sensitive means. The devices include optical couplers of the head-on and side-on types, optical modulators and switches, as well as display units.

15 Claims, 3 Drawing Sheets

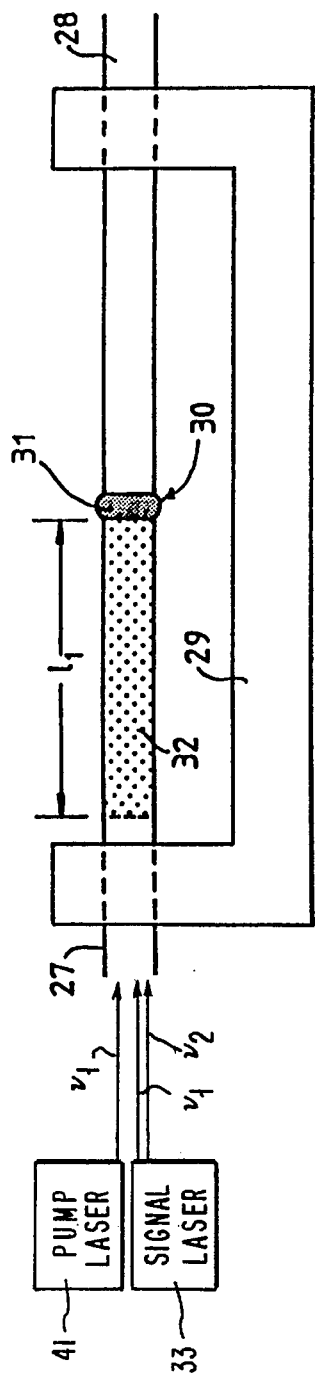
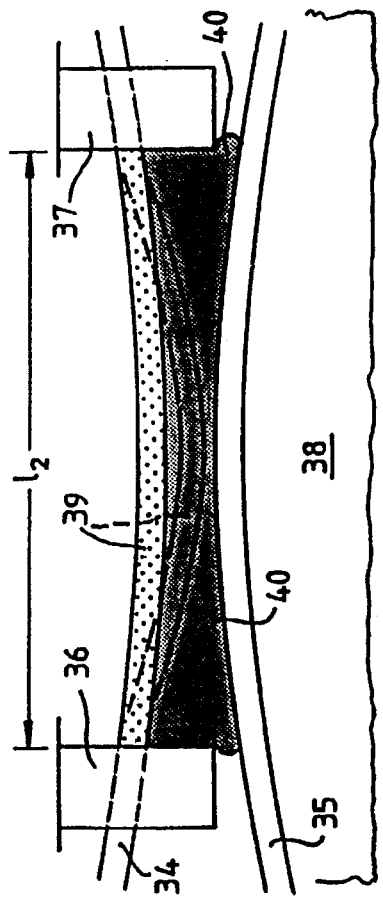
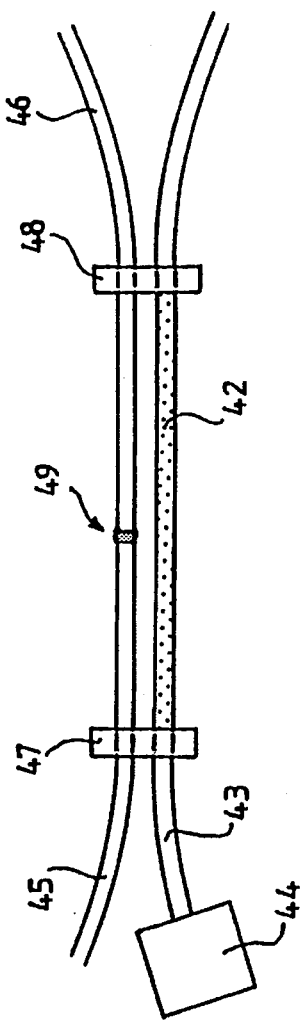

NEAR-FIELD PHOTON TUNNELING DEVICES USING LIQUID METAL

FIELD OF THE INVENTION

This invention relates to near-field photon tunneling devices, and more particularly, to devices that permit controlled transfer of photons from one transmission medium to another, where the control is implemented through mechanically regulating the tunneling of the photons through a potential barrier.

BACKGROUND OF THE INVENTION

To cope with the mounting flood of information and data which have to be transmitted over ever increasing distances at growing speed, all of which can be handled only with broadband transmission media that allow the highest transmission rates and yet have the least losses, communication techniques employing glass fibers have been developed which rapidly replace existing electronic communications technology down to the private branch exchange level. Devices in glass fiber technology, therefore, enjoy increasing attention.

The information transmission capabilities of optical fibers are well known in the art, and a very large number of optical devices for the connection of optical fibers to transmitter and receiver, as well as with other optical fibers are known in the art.

Partial power coupling between single-mode fibers, for example, is difficult to realize since the actual fabrication of an evanescent-field type coupler is tedious because the fiber core diameter is only a few micrometers, and the fiber is buried deep inside the cladding which is typically only 0.1 mm in diameter.

In a publication by M. J. F. Digonnet et al., IEEE J. Of Quantum Electronics, Vol. QE-18, No. 4 April 1982, pp. 746–754; a tunable single-mode coupler is described where the two halves of the coupler are placed in a holder provided with micrometric screws that permit one to adjust the mutual position of those halves and with it the strength of the coupling between the fibers. A different type of tunable coupler is described in a publication by G. Fawcett et al., Electron. Lett. 28, No. 11, May 1992, pp. 985–986. In G. Fawcett et al., the coupling strength is controlled by an electric field across an electro-optic polymer that is placed in the evanescent field of an optical fiber. Variation of the electric field causes corresponding variation of the refractive index of the polymer, thus leading to intensity modulation in the fiber or in the light collected from the polymer, at a particular wavelength.

While the tunable single-mode coupler described in the publication by M. J. F. Digonnet et al. above is obviously meant for a single adjustment, i.e., it would be impractical to readjust the setting of the micrometer screw during operation, the publication by G. Fawcett et al. does not show how the optical energy could be coupled between two optical fibers.

SUMMARY OF THE INVENTION

Accordingly, the present invention teaches near-field photon tunneling devices comprising at least two optical waveguides, such as optical fibers, arranged in juxtaposition with a variable tunnel barrier through which photons from at least one of said optical waveguides can be caused to tunnel, and wherein the said tunnel barrier consists of a gap of controllable width containing a layer of liquid metal. Such liquid metal layer may consist of a metal selected from the group comprising gallium, indium, mercury and their alloys.

The invention is applicable in the field of information processing where the transfer of information-carrying lightwaves between two or more transmission media, or between a transmission medium and an observer's eyes, is being controlled.

In particular, the invention is directed to devices permitting the controlled transfer of photon energy between two or more optical waveguides, such as glass fibers or other light transmitters, namely to optical couplers, optical modulators and optical switches.

The present invention provides for mechanical control of the coupling between optical transmission media.

It is an object of the present invention to improve on the published devices above and to provide optical coupling devices with remotely tunable coupling characteristics.

BRIEF DESCRIPTION OF THE DRAWING

These and other features, objects, and advantages of the present invention will become apparent upon a consideration of the following detailed description of the invention when read in conjunction with the drawing, in which:

FIG. 4 depicts a head-on coupler in accordance with the invention;

FIG. 5 shows a side-on optical coupler;

FIG. 6 shows another embodiment of a side-on optical coupler;

DESCRIPTION OF THE PREFERRED EMBODIMENT

Figure 1A:
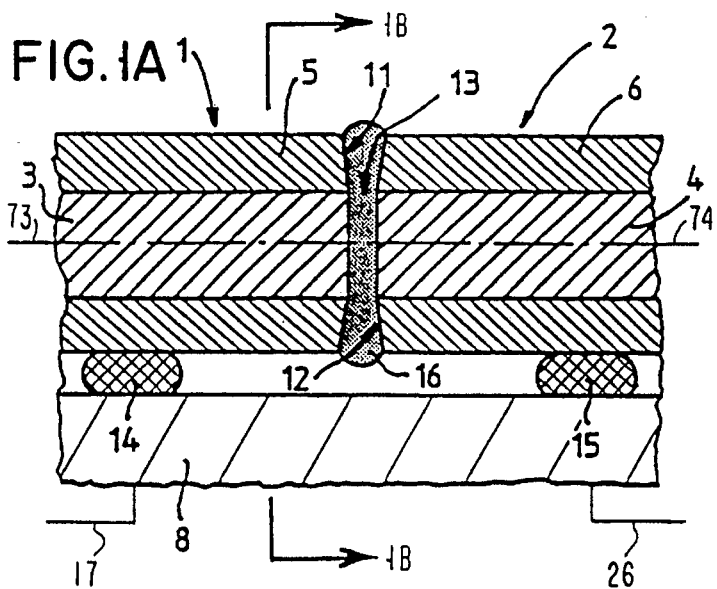
FIG. 1A shows a longitudinal cross-section view of a head-on optical coupler in accordance with the invention.

In accordance with the invention, electro-optic and opto-optic devices, such as, for example, couplers, modulators and switches, can be realized on the basis of the physical phenomenon known as "near-field optics" (NFO), in particular with the aid of photon tunneling through a variable tunnel barrier. In this connection, the gist of the invention resides in the employment of a liquid metal as the constituent of the variable tunnel barrier in these optical devices.

The liquid metal combines two characteristics that are essential in the realization of the devices in accordance with the invention: (1) The metal being liquid at operating temperature (be it room temperature or a moderately elevated temperature) is highly deformable and, thus, allows easy variation of the thickness of a layer of liquid metal within the tunnel gap, and (2) the liquid metal has a very high absorption coefficient so that very little variation of the thickness of the metal layer results in a very large change in the optical coupling: A thickness variation of between 20 and 40 nm is sufficient to alter the photon transmission through the liquid metal by a factor of 10 to 100.

The thickness variation is easiest produced by adjusting the tunnel gap width between the optical waveguides involved. Considering that the amount of mutual displacement required is on the order of tens of nanometers only, and that the displacement should be reproducible, there are two preferred ways of producing the required mechanical shift:

by piezo-electric elements,
by heating and thermal expansion.

A combination of the two schemes is possible and will be explained below.

The description will now turn to the design of the different near field optical devices of the invention. For ease of explanation, the embodiments of the invention selected for discussion below pertain to the group working with optical fibers, but it will be obvious to those skilled in the art how to apply the principles of the invention to other types of waveguides. The first device to be described is the head-on electro-optic fiber coupler shown in FIGS. 1A and 1B. Optical fibers 1 and 2 consisting, as usual, of glass fiber cores 3 and 4, respectively, and their claddings 5 and 6, are placed butt-joint in a straight slot 7 machined into the surface of a support 8, and rest on the flanks 9 and 10 with the axes 73 and 74 of their respective cores 3, 4 perfectly aligned. Alternatively, the optical fibers 1 and 2 can be arranged coaxially within a common tubular precision mount similar to that of a conventional optical fiber connector.

The ends 11 and 12 of optical fibers 1 and 2 are polished to form flat faces across the area of the cores 3, 4. Preferably, the end faces of claddings 5, 6 are given a slightly convex shape as shown in FIG. 1A. The gap 13 is then filled with liquid metal 16. Liquid metal, as a gap filling, provides for reproducible gap deformation. As the width of gap 13 is varied during operation, the liquid metal 16 must be able to "breathe". In the arrangement where optical fibers 1 and 2 are arranged on slot 7, there is enough space around the fibers for the liquid metal to be extruded from the gap. In case of placement of the fibers inside a tubular mount, the tube must be provided with a hole in the region of the gap to allow for volume variation of the liquid metal 16 as the gap width is changed. Or else the tube must be be provided with a flexible portion in juxtaposition with the gap. Whatever the arrangement may be, it must allow a variation of the gap width on the order of 50 nm.

Several metals, in particular alloys, are known to be liquid at, or near, room temperature. Examples are: Indium/gallium eutectic alloy with a melting point at 15.7° C., indium/mercury alloys with up to 70% indium, or pure gallium with a melting point at 29° C., or pure mercury. Also, more complicated alloys, such as ternary or higher compositions are known to be liquid at room temperature or at a somewhat elevated temperature, say up to about 300° C. For more information on liquid metals, reference is made to M. Hansen et al., Constitution of Binary Alloys, McGraw-Hill Book Company, Inc., New York 1958, in particular pp. 745–747.

In order to maintain a stable fluid film between the end surfaces 11, 12 of the optical fibers 1 and 2, even at very small gap widths, it is necessary that the liquid metal 16 wet the glass fiber and/or the cladding material, at least to a certain extent.

The properties of Ga/In alloy are favorable in this respect, for example, in contrast to pure mercury, since clean dry surfaces of glass and similar materials, such as the usual cladding material, are readily wetted. Also, metallized surfaces are wetted without a problem. It may, therefore, be advantageous to coat the end surfaces 11, 12 of the optical fibers with a thin metal film, such as gold or chromium, for example.

The wetting requirement can also be met in other ways. There is a large variety of chemical and mechanical surface preparation techniques available to achieve wettability. Also, since these devices are normally encapsulated in a sealed casing, hydrostatic pressure may be applied to improve wetting.

Ideally, the adhesion between the liquid metal 16 and the end surfaces 11, 12 is positive but small, lest the fluid motion is hampered by surface effects. Gap 13 may be filled under vacuum conditions. The mechanical forces of acceleration, and viscous flow, estimated on the basis of classical hydrodynamics, are negligibly small compared to the forces generated by piezo-electric elements.

The liquid metal 16 disposed between end surfaces 11 and 12 takes the form of a very thin film. An optical wave passing through a thin metallic film is heavily attenuated. The penetration depth $z_0$ (defined as the 1/e intensity decay length) for the photons typically is $z_0=5 \ldots 20$ nm. It will, therefore, be sufficient if a displacement in the range of 2 to 6 decay lengths $z_0$ between the said end surfaces is possible. This displacement can be reproducibly achieved by means of a piezo-electric element to which optical fibers 1 and 2 are fixed. For example, support 8 may consist of a piezo-electric material, and optical fiber 1 may be assumed to be glued thereto, as indicated by the droplet of glue 14, and optical fiber 2 is likewise glued to support 8 by means of a droplet of glue 15. Application of an electrical potential across support 8 in the region between droplets 14 and 15 by way of leads 17 and 26 will cause gap 13 to be varied in dependence on the polarity and amplitude of the said potential.

Ceramic piezo-electric elements, such as, for example, tubes of 2 mm diameter, with a wall thickness of 0.4 mm, a length of 10 mm and having a piezo-electric coefficient of about $10^{-10}$ m/V (which corresponds to a conversion efficiency $\Delta z/\Delta U \simeq 2.5$ nm/V.) are commercially available. The operating voltage for these elements is, thus, far less than 100 V. Because of its small dimensions, the assembly—comprising the end sections of the optical fibers and support 8—will have a high mechanical resonance frequency (>30 kHz) corresponding to short response times (<100 μs).

For initial alignment of the tunable optical fiber coupler being described, the ends of fibers 1 and 2 are brought in physical contact with each other while a contracting potential corresponding to about $3z_0(\simeq -15$ V) is applied to the electrodes of the piezo-electric support 8. The glue is then applied and allowed to harden. When the potential is removed, support 8 will relax, and the gap between optical fibers 1 and 2 will be about 30 nm wide. With the application of potentials between +15 V and −15 V, the coupling between fibers 1 and 2 can be adjusted from about 0% (corresponding to $\simeq 6z_0$) to 100% at physical contact.

If the electrodes or leads 17 and 26 of piezo-electric support 8 are fed with an alternating potential of 15 V amplitude, the arrangement described can be operated as a modulator. With the piezo-electric tube described above, an upper frequency of >30 kHz appears possible.

The same arrangement of optical fibers 1, 2 and support 8 can be operated as an optical switch. For a NORMAL ON type switch, fibers 1 and 2 are brought in physical contact with no potential applied to support 8. After the glue has hardened, the application of a potential corresponding to 6 $z_0$ will cause the switch to disrupt the coupling between fibers 1 and 2 completely. Conversely, when a potential corresponding to 6 $z_0$ is applied while the glue is hardening, the switch will be in the NORMAL OFF state when the potential is removed.

Figure 1B:
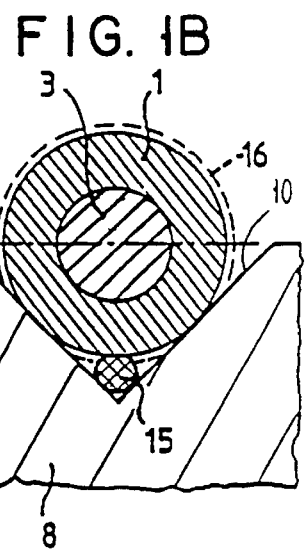
FIG. 1B shows a cross-section view along the line 1B—1B of FIG. 1A.
Figure 2:
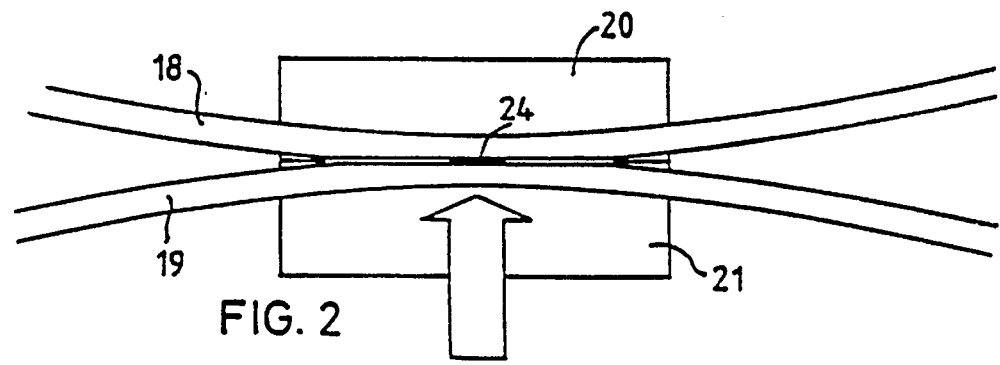
FIG. 2 is side view showing the arrangement of the optical fibers in a side-by-side optical coupler.
Figure 3:
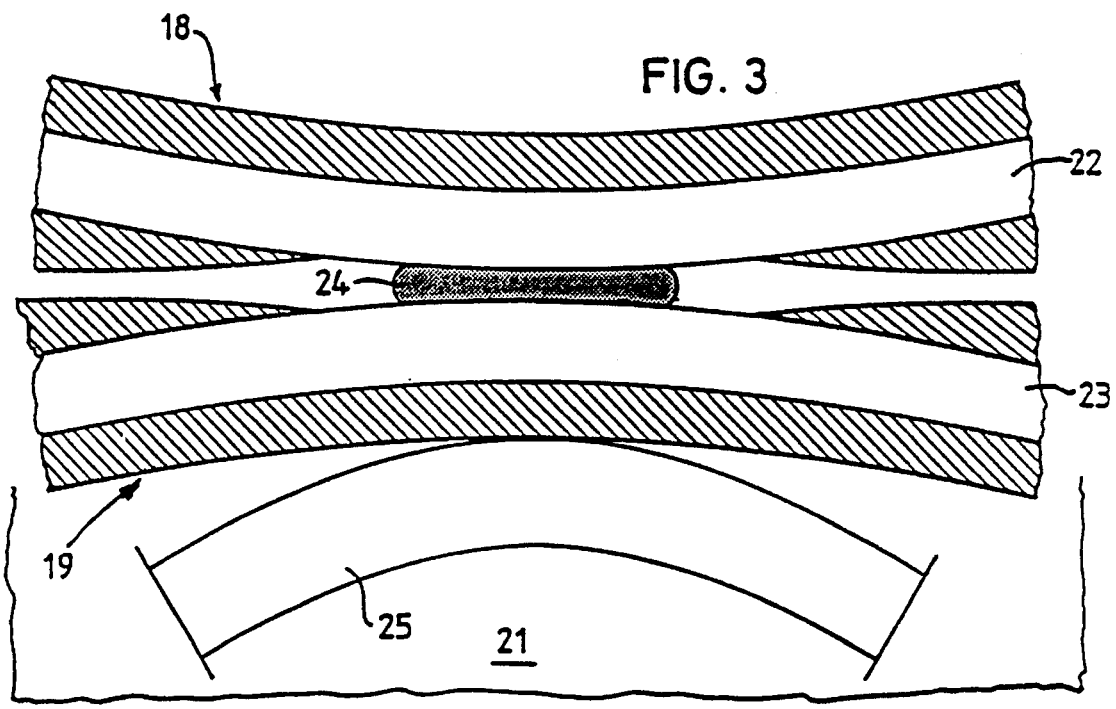
FIG. 3 is an enlarged view of the coupling portion of the coupler of FIG. 2.

Reference is now made to FIGS. 2 and 3 which shows a conventional side-on electro-optic fiber coupler of the type shown in FIG. 1B of the publication by Digonnet et al. supra. Two optical fibers 18, 19 are mounted between two appropriately slotted blocks 20 and 21, with the cladding of the fibers removed at the portions of the fibers arranged closest to each other to such an extent that the cores 22 and 23 are exposed over a distance of about one millimeter. In accordance with the invention, the mutual distance between the cores is on the order of several $z_0$, as shown in FIG. 3. The space between cores 22 and 23 is filled with liquid metal 24. A piezo-electric bimorph slab 25 (such as those mass-produced for buzzer applications, for example) is rigidly mounted on block 21 so as to touch on optical fiber 19 with its convex side.

As a potential is applied to it, bimorph 25 expands, thus pressing against fiber 19 which in turn bends to narrow the gap between it and fiber 18, thinning the liquid metal layer 24. Again, the degree of optical coupling between fibers 18 and 19 depends on their separation and on the attenuation characteristics of the liquid metal. Because of the very small values of the optical decay length in metals, tiny variations of the mutual separation between the fibers are sufficient for large changes in coupling. For example, an exemplary bimorph as short as 6 mm, and 0.5 mm thick, can provide a deflection of about 10 nm/V.

The initial setting of this coupler can be chosen such that at zero potential at bimorph 25, the thickness of the liquid metal layer 24 exceeds 6 $z_0$. Light entered into any one of fibers 18 or 19, no matter at which end thereof, will pass the coupler essentially unaffected and exit from the remote end of the same fiber unattenuated. There will be no coupling of light into the paired fiber. With potential applied to bimorph 25, the thickness of the liquid metal layer 24 will be decreased correspondingly, and light will be coupled from the input fiber into the paired fiber. Assuming lossless conditions (not realistic in practical applications, however), a maximum of 50% of the input light energy will be transferred onto the paired fiber.

To render this coupler heat-controllable, bimorph 25 will simply have to be replaced by a bimetal element. The bimetal element may consist of two metal layers. Each layer having a metal selected to provide a different coefficient of thermal expansion than the other layer, to provide bending of the bimetal element with a change in temperature. The initial setting of the bimetal element can follow the principles of a thermostat setting. This will lead to a temperature-dependent variation of the coupling degree.

The next device to be described is the head-on all-optic fiber coupler shown in FIG. 4. The optical fibers 27 and 28 are rigidly fixed in a support 29 with a small gap 30 between their ends. Gap 30 is filled with a liquid metal 31. The end section 32, of a length $l_1$, of the optical fiber 27 on the input side of the coupler is doped so as to absorb radiation at a frequency $v_1$, and it is thinned down to a radius of $\simeq 10$ μm. The radiation $v_1$ can either come from a signal laser 33 (with a frequency $v_1$), and then the coupler acts as a non-linear optical element, or from a second emitter pump laser 41 with a frequency $v_1$. In the latter case, the transmission of the signal from signal laser 33 at frequency $v_2$ outside the absorption band is switched by the pump laser 41 shown in FIG. 4.

Considering the case of the pump laser-actuated coupler: When it becomes exposed to the pump radiation, end section 32 expands by $$\Delta l = \alpha_1 l_1 \Delta T, \tag{1}$$

thereby closing gap 30. ($\alpha_1$=coefficient of linear thermal expansion.) The temperature increase $\Delta T$ is given by the balance of absorbed power per unit length $\hat{P}=\int p(\vec{r})dA$ and of the heat diffused to the surrounding liquid metal bath which acts as a heat sink. Here $P(\vec{r})$ is the locally absorbed power density and dA an element of the cross-sectional area A. Power consumption and switching speed are governed by the equation of heat diffusion:

$$\rho C_p \dot{T}(\vec{r}) = K \nabla^2 T(\vec{r}) + p(\vec{r}) \tag{2}$$

where $\rho C_p$ and K are the specific heat per unit volume and the heat conductivity, respectively.

An order of magnitude estimate is obtained by assuming that p and $\Delta T$ depend on the radial coordinate r only, by setting $\nabla^2 T(r) = \Delta T/R^2$ and $\vec{p}(r) = \hat{P}/R^2$, and by considering stationary conditions, $\dot{T}=0$. The combination of equations [1] and [2] yields for the entire energy dissipated in the HOLD state:

$$P_{HOLD} = \hat{p} l_1 = \left(\frac{K}{\alpha_1}\right) \Delta z, \tag{3}$$

where $\alpha z = \alpha l$. The TURN-ON time is very short, given essentially by the velocity v of sound:

$$\tau_{ON} = \frac{l_1}{v}. \tag{4}$$

The TURN-OFF time is limited by the cooling rate:

$$\tau_{OFF} = R^2 \rho C_p / K. \tag{5}$$

In Table 1 the relevant parameters are put together for three types of fibers, while Table 2 shows the resulting values for temperature rise, energy consumption, switching times, and the product of power and delay ($P_{HOLD} \times \tau_{OFF}$).

A small value of R is favorable for fast heat transfer. The value of R=10 μm chosen here for the fiber radius is roughly determined by the extension of the fundamental fiber mode. $\alpha z$=30 nm is a typical value required for nearly complete change of transmission. The length $l_1$=1 mm of the doped end section 32 is chosen to be sufficiently small for a stable setup of reasonable size, but may be varied over a fairly wide range.

The energy consumption for the two inorganic glasses is relatively large, caused mainly by the small thermal expansion coefficients. The organic glass PMMA, however, provides an attractively low power consumption. The switching time $\tau_{OFF}$ is relatively slow in all three cases, limiting the device to applications requiring infrequent switching only.

TABLE 1

| Type of Fiber Parameters | Fiber Parameters | | |
|---|---|---|---|
| | Fused Quartz | Reg. Glass | PMMA |
| Core Radius [μm] | 3 | 3 | 3 |
| Effect. Radius R [μm] | 10 | 10 | 10 |
| Lin. Therm. Expan. $\alpha_1$ [K$^{-1}$] | $5 \times 10^{-6}$ | $10^{-4}$ | $10^{-4}$ |
| Heat Conduct. K [W/Km] | 1 | 1 | 0.2 |
| Spec. Heat (Vol.) $\rho C_p$ [J/Km$^3$] | $2 \times 10^6$ | $2 \times 10^6$ | $1.5 \times 10^6$ |
| Sound Velocity v [m/s] | 5500 | 4200 | 2600 |

TABLE 1-continued

Fiber Parameters

| Type of Fiber Parameters | Fused Quartz | Reg. Glass | PMMA |
|---|---|---|---|
| Figures of Merit: | | | |
| $K/\alpha_1$ [W/m] | $2 \times 10^5$ | $10^5$ | $2 \times 10^3$ |
| $K/\rho C_p$ [m²/s] | $5 \times 10^{-7}$ | $5 \times 10^{-7}$ | $10^{-7}$ |
| Values chosen: | | | |
| Active Length l [mm] | 1 | 1 | 1 |
| Elongation Δl [nm] | | | |
| Head-on: | 30 | 30 | 30 |
| Side-on: | 100 | 100 | 100 |

TABLE 2

Performance Data - Head-on Coupling

| Type of Fiber Parameters | Fused Quartz | Reg. Glass | PMMA |
|---|---|---|---|
| ΔT [K] | 20 | 10 | 1 |
| $P_{HOLD}$ [μW] | 2000 | 1000 | 20 |
| $\tau_{ON}$ [μs] | 0.2 | 0.2 | 0.5 |
| $\tau_{OFF}$ [μs] | 200 | 200 | 1000 |
| $P_{HOLD} \tau_{OFF}$ [nJ] | 400 | 200 | 20 |

Another embodiment of the invention is the side-on all-optic fiber coupler shown in FIG. 5. Optical fibers 34 and 35 are arranged in close proximity, almost sufficiently close for coupling, with fiber 34 being supported between fixed posts 36 and 37, yet free to expand, and with fiber 35 being attached to a support 38. The distance $l_2$ between posts 36 and 37 is chosen to be somewhat larger than the (longitudinal) interaction length $l_i$, typically in the range of 0.1 to 1 mm. In the region of juxtaposition of fibers 34, 35, the cladding diameter is reduced to a value appropriate for waveguide coupling, i.e. about 10 μm. The section 39 of optical fiber 34 that extends between posts 36 and 37 is doped or otherwise made absorbent for a pump radiation. The space between posts 35, 36, i.e. along section 39, is filled with a liquid metal 40.

With a pump radiation entered into fiber 34, energy is absorbed in section 39 thereof, and that section expands, moving sideways and undergoing a displacement Δz in accordance with equation 6.

$$\Delta z = \sqrt{l_2 \Delta l} = l_2 \sqrt{\alpha_1 \Delta T} . \quad (6)$$

The result of this displacement is, of course, a modification of the distance between fibers 34 and 35 and, hence a variation of the coupling coefficient.

Equation 6 indicates that the temperature increment for a certain Δz is Δl/l times smaller than in the case of the head-on coupler. The requirements with regard to power consumption hence are greatly relaxed, allowing operation with inorganic glass fibers, and giving plenty of latitude with regard to the choice of design parameters. For a numerical estimate, the same values are chosen for the parameters, except for the displacement which is assumed to be as large as Δz=100 nm. The larger value allows for making smooth contact between fibers 34 and 35 over an extended length. The resulting operating parameters are compiled in Table 3:

TABLE 3

Performance Data - Side-On Coupling

| Type of Fiber Parameters | Fused Quartz | Reg. Glass | PMMA |
|---|---|---|---|
| ΔT [K] | 0.002 | 0.001 | 0.0001 |
| $P_{HOLD}$ [μW] | 0.6 | 0.3 | 0.006 |
| $\tau_{ON}$ [μs] | 0.2 | 0.2 | 0.5 |
| $\tau_{OFF}$ [μs] | 200 | 200 | 1000 |
| $P_{HOLD} \tau_{OFF}$ [nJ] | 120 | 60 | 6 |

Still another embodiment of the invention is the coupler shown in FIG. 6. A radiation absorbing section 42 is part of an optical fiber 43 which is connected to a source 44 of pump radiation. The ends of section 42 are attached respectively to optical fibers 45 and 46 by means of a pair of clamps 47 and 48. The gap between signal fibers 45 and 46 is filled with a liquid metal 49. Section 42 will expand in proportion to the power of the pump radiation from source 44. The resultant modulation of the signal passing through the liquid metal 49 will be exponential.

Figure 7:
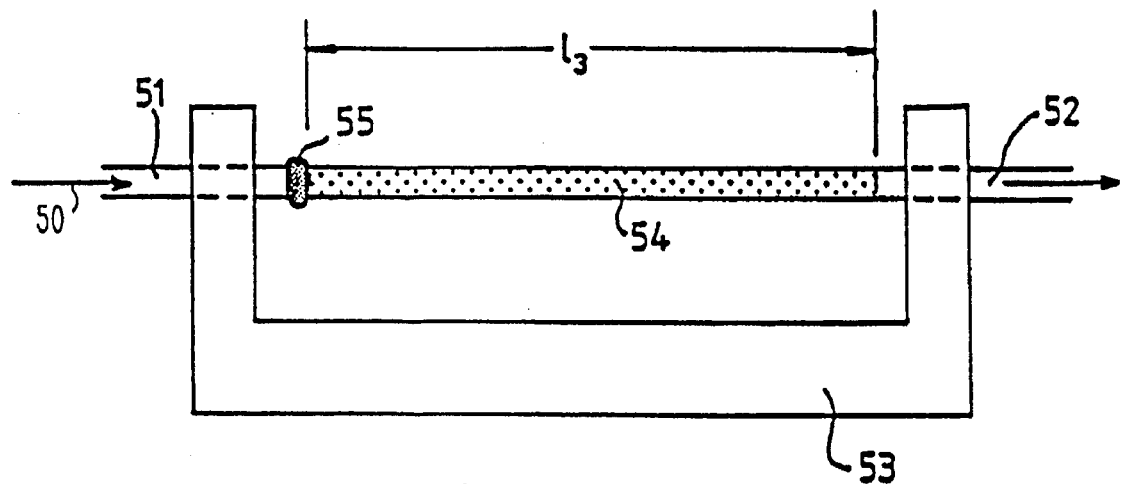
FIG. 7 illustrates a bistable coupling device.

A further embodiment of the invention is depicted in FIG. 7. Optical fibers 51 and 52 are fixed in a support 53, with a section 54 with a length $l_3$ of fiber 52 being doped with atoms to be absorbent of radiation shown by arrow 50 at the operating frequency of the device. The gap between fibers 51 and 52 is filled with a liquid metal 55. With the signal radiation applied to fiber 51, the power level inside section 54 depends on the product of the power of the signal source and of the transmission of the liquid metal. The transmission in turn is a function of temperature and, hence, of the power inside section 54. This is a typical condition for a bistable operation.

Figure 8:
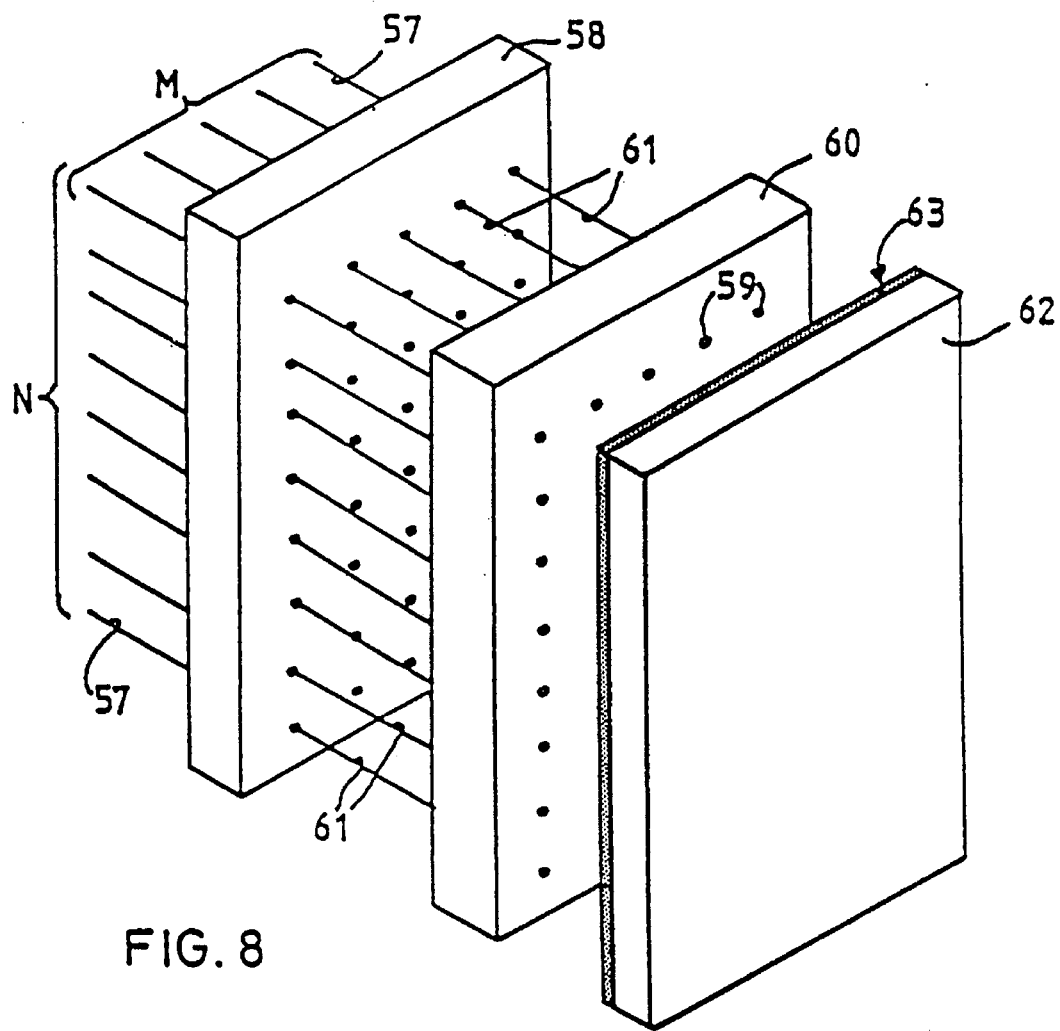
FIG. 8 shows a visual display unit employing coupling devices of the type shown in FIG. 4.

The invention is also applicable to display devices. FIG. 8 shows an embodiment of a matrix display unit in which a matrix of M×N optical fibers 57 is arranged in a way similar as in the head-on couplers described above. The fibers 57 are rigidly fixed in a mounting plate 58 and slidably supported in an M×N matrix of holes 59 in a support plate 60. When all fibers 57 are in their home position, their ends are in one common plane (as a result of polishing, for example), just by a minute distance extending from the surface of support plate 60. The distance between the mounting and support plates 58, 60 is chosen so as to provide for an ample amount of expansion of absorbent sections 61 of the fibers 57 as optical energy is applied to them. Mounted parallel to support plate 60 is a ground glass plate 62 and on its side facing said support plate 60 is a thin film 63 of liquid metal. The spacing between said support and glass plates 60, 62 is adjusted so that the ends of optical fibers 57 dip into the liquid metal.

In operation, when optical energy is applied to selected ones of fibers 57, the ensuing expansion of their respective sections 61 causes the thickness of the liquid metal film 63 between the ends of fibers 57 and the associated region of glass plate 62 to become reduced and thus more penetrable for the photons from those selected fibers. Accordingly, an image will be formed on ground glass plate 62 which corresponds to the pattern of selected, i.e. energized optical fibers 57, with the brightness of the picture points on ground glass plate 62 depending on the intensity of the light entering into the fibers 57 involved.

While there has been described and illustrated a near-field photon tunneling device with a variable tunnel barrier formed with a layer of liquid metal positioned between two optical waveguides, it will be apparent to those skilled in the art that modifications and variations are possible without deviating from the broad scope of the invention which shall be limited solely by the scope of the claims appended hereto.

Having thus described my invention, what I claim as new and desire to secure by Letters Patents is:

1. A photon tunneling device comprising:

at least two optical waveguides arranged in juxtaposition with a variable photon tunnel barrier positioned therebetween through which photons from at least one of said optical waveguides can be caused to tunnel through said barrier, said variable photon tunnel barrier includes a gap of controllable width containing a layer of liquid metal.

2. A photon tunneling device in accordance with claim 1, wherein said liquid metal layer including a metal selected from the group consisting of gallium, indium, mercury and alloys thereof.

3. A photon tunneling device in accordance with claim 1, wherein each of said at least two optical waveguides have an area of exposure to said layer of liquid metal, said area coated with a film of a material which improves said area's wettability by said liquid metal.

4. A photon tunneling device in accordance with claim 1, wherein each of said at least two optical waveguides have an area of exposure to said layer of liquid metal, said area coated with a thin film of a metal selected from the group consisting of gold and chromium, to improve said area's wettability by said liquid metal.

5. A photon tunneling device in accordance with claim 1, wherein each of said at least two optical waveguides are optical fibers having a respective end surface and an axis along said fiber.

6. A photon tunneling device in accordance with claim 5, wherein said at least two optical fibers are rigidly mounted on a length-variable support with said end surfaces facing each other with a tunneling gap in between and with said axes aligned, said gap containing said layer of liquid metal, and said support including a variable-length actuator for providing elongation/contraction of said actuator which can be remotely controlled so as to allow operation as a head-on optical coupler with controllable coupling coefficient.

7. A photon tunneling device in accordance with claim 5, wherein said at least two optical fibers are rigidly mounted on a length-variable support with said end surfaces facing each other with a tunneling gap in between and with said axes aligned, said gap containing said layer of liquid metal, and said support including a thermal expansion element for providing elongation/contraction of said actuator which can be remotely controlled so as to allow operation as a head-on optical coupler with controllable coupling coefficient.

8. A photon tunneling device in accordance with claim 5, wherein said at least two optical fibers are rigidly mounted on a length-variable support with said end surfaces facing each other with a tunneling gap in between and with said axes aligned, said gap containing said layer of liquid metal, and said support including a piezo-electric element providing elongation/contraction of said piezo-electric element which can be remotely controlled so as to allow operation as a head-on optical coupler with controllable coupling coefficient.

9. A photon tunneling device in accordance with claim 5, wherein each of said optical fiber having a core and a cladding surrounding said core, said end surface includes a surface across said core and said cladding, wherein said end surfaces of said optical fibers are polished optically flat across said cores, with said end faces across said claddings having slightly convex shape providing for a gap whose width increases in radial direction from the center of said optical fibers.

10. A photon tunneling device in accordance with claim 5, wherein said at least two optical fibers are fixed head-on, having axes aligned and positioned in a support with said gap having a width between said end surfaces filled with a liquid metal, a section of said at least two fibers associated with a radiation input of said device being radiation-sensitive, so as to vary the width of said gap in dependence on the input radiation, enabling the operation of said device as a radiation-controlled switch.

11. A photon tunneling device in accordance with claim 5, wherein a first optical fiber having a radiation-sensitive section is arranged between a pair of fixtures so as to be able, upon application of a radiation, to bend towards a second optical fiber fixed side-on-side at tunneling distance from said first optical fiber along a common interaction length ($l_1$), the cladding diameter of said optical fibers reduced at least along said common interaction length ($l_i$), and said gap between said optical fibers and at least along said interaction length ($l_i$) filled with a liquid metal, said device forming a side-on-side optic fiber coupler with radiation controlled coupling coefficient.

12. A photon tunneling device in accordance with claim 5, wherein a first optical fiber having a radiation-sensitive section and connected to a source of pump radiation is arranged side-on-side with second and third optical fibers which on their part are arranged in mutual axial alignment with their ends forming a tunnel gap, said gap being filled with a liquid metal, said second and third optical fibers being clamped to said first optical fiber along its radiation-sensitive section, said device forming a side-on-side optic fiber coupler with pump radiation-controlled coupling and exponential coupling coefficient response.

13. A photon tunneling device in accordance with claim 5, wherein a plurality of optical fibers is fixed in a mounting plate in an M×N matrix pattern, said fibers having absorbent end sections extending beyond said mounting plate and across a gap between said mounting plate and through holes ordered in the said M×N matrix pattern in a support plate fixed parallel with said mounting plate, the length-aligned end sections of said fibers dipping into a thin film of liquid metal having a thickness coated onto a ground glass plate in turn arranged parallel with and at tunnel distance from said support plate, the arrangement being such that upon application of radiation to selected ones of said optical fibers, the respective end sections of selected ones of said optical fibers elongate to decrease the thickness of said thin film at the location of said respective end sections, forming a visible image on the far side of said ground glass plate.

14. A photon tunneling device in accordance with claim 1, wherein said at least two optical waveguides are enclosed in a casing to which hydrostatic pressure is applied to improve wetting of said at least two waveguides by said layer of liquid metal.

15. A photon tunneling device comprising two optical fibers, each said optical fiber having a core and a cladding surrounding said core, said two optical fibers fixed side-on-side between two slotted blocks with a liquid metal filling a tunnel gap having a thickness between said fibers along a section thereof where said cladding is removed to expose said cores, and a remotely controllable actuator arranged for cooperation with one of said fibers so as to control the thickness of said liquid metal filling said tunnel gap when actuated, to enable operation as a side-on-side electro-optical fiber coupler with controllable coupling coefficient.

* * * * *